(12) United States Patent
Gu et al.

(10) Patent No.: US 11,218,944 B2
(45) Date of Patent: Jan. 4, 2022

(54) COMMUNICATION METHOD, DEVICE AND COMPUTER READABLE STORAGE MEDIUM FOR RELAY DEVICE

(71) Applicant: NOKIA TECHNOLOGIES OY, Espoo (FI)

(72) Inventors: Junrong Gu, Shanghai (CN); Xiaobing Leng, Shanghai (CN); Dawei Wang, Shanghai (CN); Dongyao Wang, Shanghai (CN); Gang Shen, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/769,292

(22) PCT Filed: Dec. 7, 2018

(86) PCT No.: PCT/CN2018/119913
§ 371 (c)(1),
(2) Date: Jun. 3, 2020

(87) PCT Pub. No.: WO2019/110014
PCT Pub. Date: Jun. 13, 2019

(65) Prior Publication Data
US 2020/0383031 A1    Dec. 3, 2020

(30) Foreign Application Priority Data
Dec. 8, 2017   (CN) .......................... 201711297705.4

(51) Int. Cl.
*H04W 40/22*   (2009.01)
*H04W 28/02*   (2009.01)
(Continued)

(52) U.S. Cl.
CPC ....... *H04W 40/22* (2013.01); *H04W 28/0247* (2013.01); *H04W 36/0072* (2013.01); *H04W 84/047* (2013.01); *H04W 88/04* (2013.01)

(58) Field of Classification Search
CPC ..... H04W 40/00; H04W 40/02; H04W 40/22; H04W 36/0005; H04W 36/0055; H04W 36/0072; H04W 28/0247; H04W 84/047
See application file for complete search history.

(56) References Cited

U.S. PATENT DOCUMENTS

| 10,531,365 B2 * | 1/2020 | Kaur ..................... H04W 24/04 |
| 2013/0022025 A1 * | 1/2013 | Watanabe ....... H04W 36/00835 370/332 |

(Continued)

FOREIGN PATENT DOCUMENTS

| CN | 105188099 A | 12/2015 |
| CN | 106304257 A | 1/2017 |

(Continued)

OTHER PUBLICATIONS

International Search Report and Written Opinion for Application No. PCT/CN2018/119913 dated Feb. 27, 2019, 6 pages.

(Continued)

*Primary Examiner* — Robert C Scheibel
(74) *Attorney, Agent, or Firm* — Alston & Bird LLP

(57) ABSTRACT

Embodiments of the present disclosure provide a method, device and computer readable storage medium implemented at a relay device. According to embodiments of the present disclosure, the relay device determines whether a terminal device served by a network slice has to be handed over. In a case of determining that the terminal device has to be handed over, the relay device sends a request for local information to at least one candidate relay device, and the local information includes at least one of information associated with a backhaul link from a candidate relay device to (Continued)

a network device and slice configuration information of the candidate relay device. Based on the received local information, the relay device determines a candidate relay device for handover of the terminal device. According to embodiments of the present disclosure, the relay device determines the candidate relay device to which the terminal device has to be handed over, based at least on the information associated with a backhaul link and the information associated with a network slice, so as to satisfy network slice configuration requirement and ensure backhaul quality of the terminal device.

18 Claims, 3 Drawing Sheets

(51) Int. Cl.
*H04W 36/00* (2009.01)
*H04W 84/04* (2009.01)
*H04W 88/04* (2009.01)

(56) References Cited

U.S. PATENT DOCUMENTS

| | | | |
|---|---|---|---|
| 2017/0244468 A1* | 8/2017 | Zhao | H04W 36/24 |
| 2018/0176811 A1* | 6/2018 | Delsol | H04W 84/047 |
| 2019/0261187 A1* | 8/2019 | Chen | H04W 72/0406 |
| 2019/0379450 A1* | 12/2019 | Kamei | H04B 7/15542 |
| 2020/0029384 A1* | 1/2020 | Hong | H04W 36/34 |

FOREIGN PATENT DOCUMENTS

| | | |
|---|---|---|
| CN | 106376047 A | 2/2017 |
| GB | 2 475 851 A | 6/2011 |
| WO | WO 2011/120559 A1 | 10/2011 |
| WO | WO 2016/185285 A1 | 11/2016 |
| WO | WO 2017/171598 A1 | 10/2017 |

OTHER PUBLICATIONS

R2-1701270, RRC Relay Handover Procedure for Remote UE, 3GPP TSG-RAN WG2 Meeting #97 (Feb. 17, 2017) 4 pages.
3GPP TS 36.300 v14.0.0, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14) (Sep. 2016) 314 pages.
3GPP TR 22.862 V14.1.0, $3^{rd}$ Generation Partnership Project; Technical Specification Group Services and System Aspects; Feasibility Study on New Services and Markets Technology Enablers for Critical Communications; Stage 1 (Release 14) (Sep. 2016) 31 pages.
*New SID Proposal: Study on Integrated Access and Backhaul for NR*, RP-170821, 8881123EPP TSG RAN Meeting #75 (Mar. 2017) 5 pages.
3GPP TR 38.804 V14.0.0, $3^{rd}$ Generation Partnership Project; Technical Specification Group Radio Access Network; Study on New Radio Access Technology; Radio Interface Protocol Aspects (Release 14) (Mar. 2017) 57 pages.
3GPP TR 38.801 V14.0.0, $3^{rd}$ Generation Partnership Project; Technical Specification Group Radio Access Network; Study on New Radio Access Technology; Radio Access Architecture and Interfaces (Release 14) (Mar. 2017) 91 pages.
Extended European Search Report for European Application No. 18885647.0 dated Jul. 26, 2021, 10 pages.

* cited by examiner

COMMUNICATION METHOD, DEVICE AND COMPUTER READABLE STORAGE MEDIUM FOR RELAY DEVICE

CROSS-REFERENCE TO RELATED APPLICATIONS

This application is a national phase entry of International Application No. PCT/CN2018/119913, filed Dec. 7, 2018, which claims priority to Chinese Application No. 201711297705.4, filed Dec. 8, 2017, the entire contents of which are incorporated herein by reference.

FIELD

Embodiments of the present disclosure generally relate to the wireless communication technology, and more specifically, to a communication method, a device and a computer readable storage medium for a relay device supporting a network slice.

BACKGROUND

In order to deal with an intensive cell configuration in the fifth generation (5G) of the communication system according to 3GPP and to reduce deployment of backhaul optical fibers, integrated access and backhaul (IAB) of a communication system has been developed into a research topic of 5G. For example, in 5G IAB, a relay node may be deployed in a communication network to simply backhaul complexity of the communication network and increase spectral efficiency and system capacity of a hotspot area. In a communication system comprising a relay node, a terminal device accesses a relay device using an access link from the terminal device to the relay device, so as to enable wireless or wired bidirectional communication with the relay device. The relay device accesses the network device using a backhaul link from the relay device to the network device, for example, a base station, so as to enable wireless or wired bidirectional communication with the network device.

In order to enhance flexibility and extensibility of the communication network, there is provided a network slicing technology to tailor a plurality of logical networks for different users or applications based on the existing communication architecture. Specifically, the network slicing technology allows the communication network to be divided into a plurality of logically or physically different network slices. Each of the network slices may optimize a network for one or more communication traffics having a particular quality of service (QoS) requirement, so as to flexibly support various types of communication traffics for different levels of users. In the communication network including the relay device and the network device, how to take related configuration of a network slice into account in mobility management such as handover is a problem to be solved.

SUMMARY

In a first aspect of the present disclosure, there is provided a method implemented at a relay device in a communication network. The method comprises: determining whether a terminal device served by the relay device is to be handed over, the terminal device being served by a network slice supported by the relay device, the network slice corresponding to a configuration of a set of network functions in the communication network; in response to determining that the terminal device is to be handed over, sending a request for local information to at least one candidate relay device, the local information of each candidate relay device comprising at least one of information associated with a backhaul link from the candidate relay device to a network device and slice configuration information of the candidate relay device; and in response to receiving the local information from the at least one candidate relay device, determining, based on the local information, a candidate relay device for handover of the terminal device from the at least one candidate relay device.

In a second aspect of the present disclosure, there is provided a relay device. The relay device comprises: a processor; and a memory storing instructions which, when executed by the processor, cause the relay device to perform acts comprising: determining whether a terminal device served by the relay device is to be handed over, the terminal device being served by a network slice supported by the relay device, the network slice corresponding to a configuration of a set of network functions in the communication network; in response to determining that the terminal device is to be handed over, sending a request for local information to at least one candidate relay device, the local information of each candidate relay device comprising at least one of information associated with a backhaul link from the candidate relay device to a network device and slice configuration information of the candidate relay device; and in response to receiving the local information from the at least one candidate relay device, determining, based on the local information, a candidate relay device for handover of the terminal device from the at least one candidate relay device.

In a third aspect of the present disclosure, the embodiments of the present disclosure provide a computer readable storage medium. The computer readable storage medium comprises program code stored thereon which, when executed by an apparatus, cause the apparatus to implement the method according to the first aspect.

BRIEF DESCRIPTION OF THE DRAWINGS

Through the following detailed description and the appended claims, the objectives, features, and other advantages of example embodiments of the present disclosure will become more apparent. Only for the purpose of illustration, non-limiting description on preferred embodiments will be given below with reference to the accompanying drawings, in which:

Throughout the drawings, the same or similar reference symbols refer to the same or similar elements.

DETAILED DESCRIPTION OF EMBODIMENTS

Figure 1:
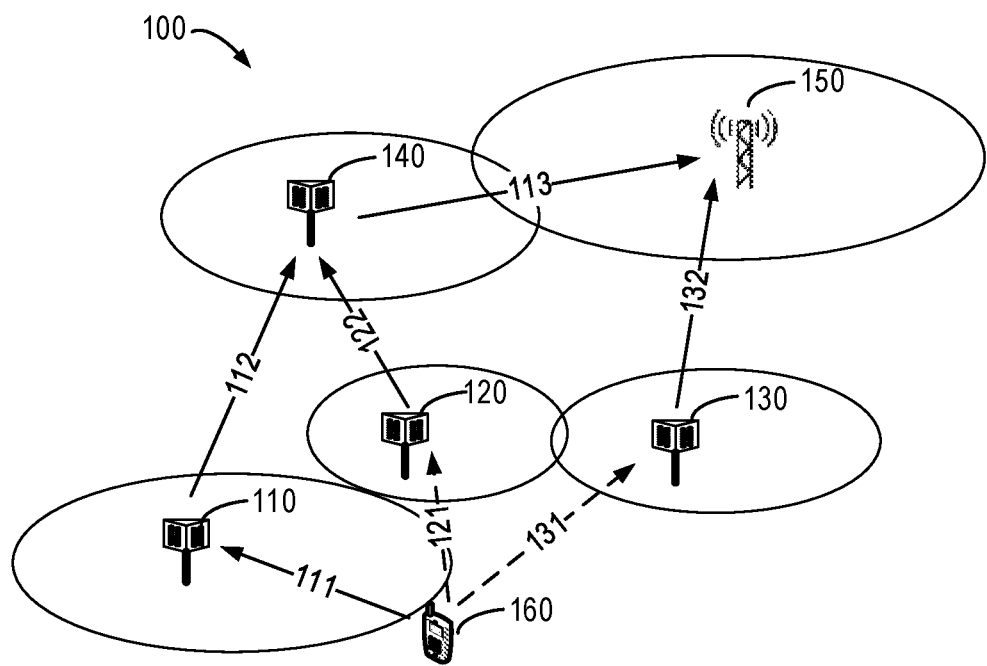
FIG. 1 illustrates a diagram of an example communication system that implements handover for a terminal device.

Embodiments of the present disclosure will be described in detail with reference to the accompanying drawings. Although the drawings illustrate some embodiments of the present disclosure, it would be appreciated that the present disclosure may be implemented in various manners but cannot be construed as being limited by the embodiments illustrated herein, and rather, these embodiments are provided to disclose the present disclosure more thoroughly and completely. It would be appreciated that the drawings and the embodiments of the present disclosure are provided merely as examples, not intending to limit the protection scope of the present disclosure.

As used herein, the term "network device" refers to any appropriate entity or device capable of providing a wireless or wired cell or coverage via which to enable a terminal device to access to a core network or receive service from a core network. The example of the network device, for example, includes a base station. The term "base station" (BS) described herein may be a node B (NodeB or NB), 5G node (gNB), evolved node B (eNodeB or eNB), remote radio unit (RRU), radio head (RH), remote radio head (RRH), relay, low power node (for example, a pico base station, femto base station and the like), or the like.

As used herein, the term "relay device" refers to any appropriate entity or device capable of providing a wireless or wired cell or coverage via which to enable a terminal device to access to a network device or receive service from a network device. The example of the relay device, for example, includes a relay station. The term "relay station" (relay or RN) described herein may be a wireless or wired relay station, repeater, small base station, home base station, amplifier, remote radio unit, radio head, remote radio head, low power node (for example, a pico base station, femto base station and the like), or the like.

The term "terminal device" or "user equipment" (UE) used herein refers to any entity or device capable of being in wireless communication with a network device or a further counterpart. For example, the terminal device may include a mobile terminal (MT), subscriber station (SS), portable subscriber station (PSS), mobile station (MS) or access terminal (AT), the above device on a vehicle, a machine or electric appliance having a communication function, and the like.

As used herein, the term "includes" and its variants are to be read as open-ended terms that mean "includes, but is not limited to." The term "based on" is to be read as "based at least in part on." The term "one embodiment" is to be read as "at least one embodiment;" and the term "another embodiment" is to be read as "at least another embodiment." The terms "first," "second," and the like are provided only to distinguish one element from another one. As a matter of fact, the first element may also be referred to as second element, or vice versa. Other definitions, either explicit or implicit, may be included below.

For ease of illustration, some embodiments of the present disclosure are introduced herein with wireless communication (for example, cellular communication) as the background, and the terms in, for example, Long Term Evolution/Long Term Evolution-Advanced (LTE/LTE-A) formulated by 3GPP or 5G. However, as appreciated by those skilled in the art, the embodiments of the present disclosure are limited by no way to a wireless communication system following the wireless communication protocol formulated by 3GPP, but instead, may be applied to any communication system containing a similar problem, such as WLAN, a wired communication system, other communication system to be developed in the future, or the like.

FIG. 1 illustrates a diagram of an example communication system 100 that implements handover for a terminal device. In the example, the communication system 100 may include relay devices 110, 120, 130 and 140, a network device 150 and a terminal device 160. In the communication system 100, the relay devices 110, 120, 130 and 140 and the network device 150 provide a wireless connection to the terminal device 160 within the coverage thereof. It would be appreciated that the respective numbers of the network devices, relay devices and terminal devices, as shown in FIG. 1, are provided merely for illustration, without any intention for limitation. The communication system 100 may include any respective appropriate numbers of network devices, relay devices and terminal devices.

Without loss of generality, communication in respective access links and backhaul links in the communication system 100 may follow any appropriate wireless communication technology and a corresponding communication standard. The example of the communication technology includes, but is not limited to, Long Term Evolution (LTE), Long Term Evolution-Advanced (LTE-A), Wideband Code Division Multiple Access (WCDMA), Code Division Multiple Access (CDMA), Global System for Mobile Communication (GSM), Orthogonal Frequency Division Multiplexing (OFDM), Wireless Local Area Networks (WLAN), Worldwide Interoperability for Microwave Access (WiMAX), Bluetooth, Zigbee technology, Machine Type Communication (MTC), D2D, M2M or the like. Moreover, the communication may be executed according to any appropriate communication protocol, and these communication protocols include, but are not limited to, Transmission Control Protocol (TCP)/Internet Protocol (IP), Hyper Text Transfer Protocol (HTTP), User Datagram Protocol (UDP), Session Description Protocol (SDP), and the like.

In FIG. 1, without loss of generality, it is assumed that the terminal device 160 is provided with relay service by a network slice of the relay device 110 (not shown, which is referred to as "a first network slice"). In the communication system 100 as shown in FIG. 1, a network slice corresponds to the configuration of the communication system 100 for a set of network functions of a set of specific traffics. Specifically, different relay devices may be configured with different network slices, i.e., different relay devices may support different types of network slices. For example, the relay device 110 and the relay device 130 may only support the first network slice, while the relay device 120 supports a further network slice in addition to the first network slice.

To be specific, the terminal device 160 may be in bidirectional communication with the relay device 110 via an access link 111 from the terminal device 160 to the relay device 110. The relay device 110 is connected to the network device 150 via a further relay device 140. As shown in FIG. 1, the link 112 from the relay device 110 to the relay device 140 and the link from the relay device 140 to the network device 150 may be shown as a backhaul link 112 and a backhaul link 113, respectively. In addition to the relay device 110 providing service to the terminal device 160, there are, for example, two candidate relay devices 120 and 130 in the proximity of the terminal device 160. As an example, the candidate relay device 120 may provide potentially relay service for the terminal device 160 via an access link 121 and backhaul links 122 and 113, while the candidate relay device 130 may provide potentially relay service for the terminal service 160 via an access link 131 and a backhaul link 132.

When the terminal device 160, for example, is located at a cell edge of the relay device 110, the terminal device 160 probably has to be handed over from the relay device 110 to other candidate relay devices, for example, relay devices 120 and 130 as shown in FIG. 1, for continuing with relay communication.

In the conventional communication system, when the terminal device has to be handed over, the terminal device, for example, selects a relay device having the best channel quality as a target relay device for handover, based on the channel qualities of the access links between the terminal device and the candidate relay devices. Nonetheless, in a relay communication system supporting network slices, the candidate relay device having the best access channel quality probably does not support the network slice serving the terminal device at present. In the case, the terminal device probably has to reconfigure the network slice, in addition to execution of handover to the target relay device, which increases the implementation complexity of the terminal device and results in an unsatisfactory handover delay. Moreover, since different candidate relay devices correspond to different backhaul links, selecting a different candidate relay device as the target relay device causes a different backhaul delay in the subsequent communication.

The embodiments of the present disclosure provide a communication solution of selecting one candidate relay device for use in handover of the terminal device based on information associated with backhaul links and configuration information of network slices. In general, according to the embodiments described herein, in the relay communication system supporting network slices, assuming that the relay device 110 determines that the terminal device 160 has to be handed over, the relay device 110 sends a request for a local message to the candidate relay devices 120 and 130. A local message of a candidate relay device includes at least one of information associated with the backhaul link of the candidate relay device and configuration information of a network slice supported by the candidate relay device. Based on the obtained local messages of the candidate relay devices 120 and 130, the relay device 110 selects a candidate relay device from the candidate relay devices as the target relay device for the handover of the terminal device 160.

Through the description below, it would be clear that, in comparison with the conventional handover solution of determining a candidate relay device based on the channel quality of the access link, according to the embodiments of the present disclosure, the relay device 110 would select a candidate relay device for the terminal device 160 by considering the configuration information of the network slices supported by the candidate relay devices 120, 130 and information of backhaul links from the candidate relay devices 120, 130 to the network device 150, for use in the handover of the terminal device 160. Therefore, the handover method in the present disclosure may satisfy the slice configuration requirement of the relay communication system 110 supporting network slices, thereby preventing the terminal device 160 from reconfiguring the network slices, and may ensure the backhaul quality of the terminal device 160.

Figure 2:
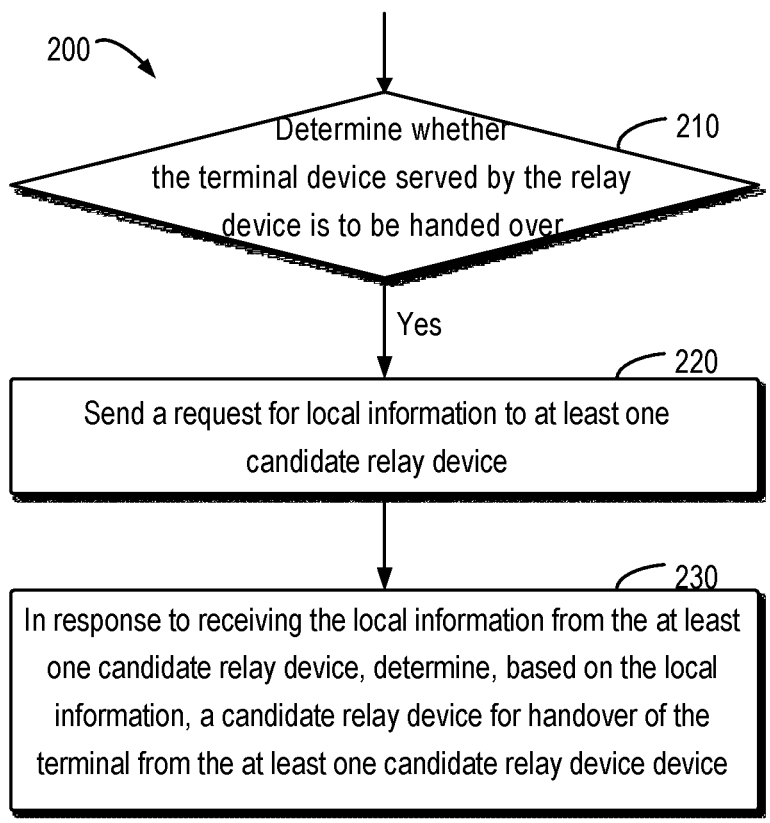
FIG. 2 illustrates a flowchart of an example method implemented at a relay device according to some embodiments of the present disclosure.

FIG. 2 illustrates a flowchart of an example method 200 implemented at the relay device 110 according to some embodiments of the present disclosure. Hereinafter, the relay device 110 currently serving the terminal device 160 is used as an example for describing the method 200 as shown in FIG. 2. It would be appreciated that the method 200 may also be implemented, for example, in other appropriate relay device.

As shown in FIG. 2, at block 210, the relay device 110 determines whether the terminal device 160 served by it is to be handed over. As described above, without loss of generality, it is assumed that the terminal device 160 is being served by a first network slice supported by the relay device 110.

In some embodiments, it may be determined at the terminal device 160 whether it has to be handed over, and the result is notified to the relay device 110. For example, the relay device 110 may receive, from the terminal device 160, an indication (which is referred as "a first indication") indicating that the terminal device 160 has to be handed over. Based on the received first indication, the relay device 110 may determine that the terminal device 160 is to be handed over. For example, the first indication may be included, for example, but not limited to, in uplink control information (UCI), a media access control (MAC) control element (CE), and high-level signaling, such as radio resource control (RRC) signaling or the like.

Alternatively, the relay device 110 may determine whether the terminal device 160 has to be handed over based on information received from the terminal device 160. In some embodiments, the relay device 110 may receive, from the terminal device 160, channel quality (which is referred to as "first channel quality") of the channel between the terminal device 160 and the relay device 110. In some embodiments, if the received first channel quality is lower than certain threshold quality, the relay device 110 may determine that the terminal device 160 has to be handed over.

In some other embodiments, if the relay device 110 determines that the first channel quality is lower than the threshold quality, the relay device 110 further compares the first channel quality with channel quality (which is referred to as "second channel quality") of at least one channel between the terminal device 160 and the relay devices 120, 130. In the case, when the first channel quality is lower than the second channel quality, the relay device 110 may determine that the terminal device 160 has to be handed over. For example, in order to obtain the second channel quality, the relay device 110 may send, to the terminal device 160, a further indication (which is also referred to as "a second indication") for the terminal device 160 to send a measurement signal to the candidate relay devices 120, 130. The measurement signal is used by the candidate relay devices 120, 130 in measurement to determine the second channel quality. The candidate relay devices 120, 130 may send the measured second channel quality to the relay device 110, such that the relay device 110 may determine, based on the second channel quality received from the candidate relay devices 120, 130, whether the terminal device 160 is to be handed over. As a further example, more than obtaining the first indication or the first channel quality from the terminal device 160, the relay device 110 may obtain periodically or aperiodically the local information of the relay devices 120, 130, for example, based on triggering by other events, so as to determine whether the terminal device 160 has to be handed over.

In the above embodiment, the first channel quality and the second channel quality may include, but are not limited to, signal noise ratio (SNR), signal to interference plus noise ratio (SINR), reference signal receiving power (RSRP), reference signal receiving quality (RSRQ) and the like.

Still referring to FIG. 2, when it is determined at block 210 that the terminal device 160 has to be handed over, the method 200 moves to block 220, at which the relay device 110 sends a request for local information to the candidate relay devices 120, 130. The local information of the candidate relay devices 120, 130 includes information associated with backhaul links from the candidate relay devices 120, 130 to the network device 150, or slice configuration information of the candidate relay devices 120, 130, or both. The information associated with backhaul links of the candidate relay devices 120, 130 may indicate respective backhaul delays between the relay devices 120, 130 and the network device 150. As an example, the information associated with the backhaul links of the relay devices 120, 130 may include the number of hops of the backhaul links from the candidate relay devices 120, 130 to the network device 150. For example, referring to FIG. 1, the backhaul links from the candidate relay device 120 to the network device 150 are links 122 and 113, i.e., the number of hops of the backhaul links is 2, while the backhaul link from the candidate relay device 130 to the network device 150 is the link 132, i.e., the number of hops of the backhaul link is 1. As an another example, the information associated with the backhaul links of the candidate relay devices 120, 130 may further include respective backhaul delays of the backhaul links from the candidate relay devices 120, 130 to the network device 150.

In some embodiments, the slice configuration information of the candidate relay devices 120, 130 includes slice configuration information associated with network slices supported by the candidate relay devices 120, 130. As an example, the slice configuration information of the candidate relay devices 120, 130 includes a set of network slices supported by the candidate relay devices 120, 130. As described above, referring to FIG. 1 and the related description, the candidate relay device 120 may support the first network slice and the second network slice, while the candidate relay device 130 is dedicated to supporting the first network slice.

In addition, the local messages of the candidate relay devices 120, 130 may further include channel quality of channels between the candidate relay devices 120, 130 and the terminal device 160 and/or traffic load information of the candidate relay devices 120, 130. According to the information, the relay device 110 may take into account more factors, such as network topology, slice configuration and the like, to determine a candidate relay device for handover of the terminal device 160.

At block 230, in response to receiving a local message from the candidate relay devices 120, 130, the relay device 110 determines a candidate relay device from the candidate relay devices 120, 130 based on the local messages, for use in the handover of the terminal device 160.

In some embodiments, in a case that the local information in the candidate relay devices 120, 130 includes the information associated with the backhaul links from the candidate relay devices 120, 130 to the network device, the relay device 110 may determine the information associated with the backhaul delays of the backhaul links based on the information associated with the backhaul links. The relay device 110 may determine a candidate relay device from the candidate relay devices 120, 130 based on the determined information associated with the backhaul delays, for use in the handover of the terminal device 160. As described above, for example, the information associated with the backhaul links may include backhaul delays from the candidate relay devices 120, 130 to the network device 150. In the case, the relay device 110 may select a candidate relay device corresponding to a low backhaul delay, for example, the candidate relay device corresponding to the lowest backhaul delay, as the target relay device for handover of the terminal device 160. Alternatively or in addition, the information associated with the backhaul links may include the number of backhaul hops from respective candidate relay devices 120, 130 to the network device 150. Correspondingly, the relay device 110 may select the candidate relay device corresponding to a small number of backhaul hops, namely the candidate device 130 as shown in FIG. 1, as the target relay device for handover of the terminal device 160.

In some embodiments, in the case that the local information of the candidate relay devices 120, 130 includes slice configuration information of the candidate relay devices 120, 130, based on the slice configuration information of the candidate relay devices 120, 130 and the information of the first network slice currently serving the terminal device, the relay device 110 may determine a candidate relay device from the candidate relay devices 120, 130 for use in the handover of the terminal device 160.

As an example, it is assumed that the current terminal device 160 is being served by the first network slice of the relay device 110, while the candidate relay device 120, for example, may support the first network slice and the second network slice, and the candidate relay device 120, for example, may support the first network slice only, i.e., it is dedicated to supporting the first network slice. The candidate relay device 130 dedicated to supporting the first network handover probably provides better relay service for the terminal device 160. Therefore, in this case, the relay device 110 may select the candidate relay device 130 dedicated to supporting the first network slice, for use in the handover of the terminal device 160.

It would be appreciated that the relay device 110 makes every effort to select the candidate relay device supporting the first network slice for use in the handover of the terminal device 160, so as to avoid the need of reconfiguring the network slice by the terminal device 160. In addition, if several candidate relay devices all support the first network slice, the relay device 110 may select a candidate relay device dedicated to supporting the first network slice for use in the handover of the terminal device 160, so as to obtain better network slice service.

In some embodiments, the relay device 110 may select a candidate relay device from the candidate relay devices 120, 130 for use in the handover of the terminal device 160, based on both the information associated with the backhaul links from the candidate relay devices 120, 130 to the network device 150 and the slice configuration information of the candidate relay devices 120, 130. According to the spirits and teaching of the embodiments of the present disclosure, it would be appreciated that any change, variant and modification to the embodiments as discussed above shall be regarded as falling into the scope of the present disclosure.

In some embodiments, the local information for determining a target relay device may further include second channel quality from the candidate relay devices 120, 130 to the terminal device 160 and traffic load information of the candidate relay devices 120, 130. In an example, the relay device 110 may select an appropriate candidate relay device, based on the information associated with the backhaul links and the slice configuration information of the candidate relay devices, in combination with the traffic load condition of the candidate relay devices 120, 130.

For example, if a traffic load of a certain candidate relay device selected based on the information associated with the backhaul links and/or the slice configuration information of the candidate relay devices is greater than a threshold load, the relay device 120 may select another candidate relay device for use in the handover. In a further example, in a case that second channel quality of a certain candidate relay device selected on the basis of the information associated with the backhaul links and/or the slice configuration information of the candidate relay devices is lower than certain threshold quality, the relay device 120 may select another candidate relay device for use in the handover. It would be appreciated, when designing an implementation for determining a candidate relay device, corresponding changes, variants and modifications to the embodiment as described above are allowed according to the spirits and teaching of the embodiments of the present disclosure, and these changes, variants and modifications should be regarded as falling into the scope of the present disclosure.

Through the method 200, the relay device 110 may select a candidate relay device for use in the handover of the terminal device 160, based on at least one of the information associated with the backhaul links from the candidate relay devices 120, 130 to the network device 150 and the slice configuration information of the candidate relay devices 120, 130. Hence, in some embodiments of the present disclosure, a delay factor of the backhaul links of the candidate relay devices 120, 130 are taken into account, thereby reducing the transmission delay of the terminal device 160 after handover. Furthermore, in some other embodiments of the present disclosure, slice configuration information of different candidate relay devices 120, 130 is taken into account, thereby preventing the terminal device from reconfiguring the network slice, and supporting the network slice technology better in handover of the relay communication system.

Figure 3:
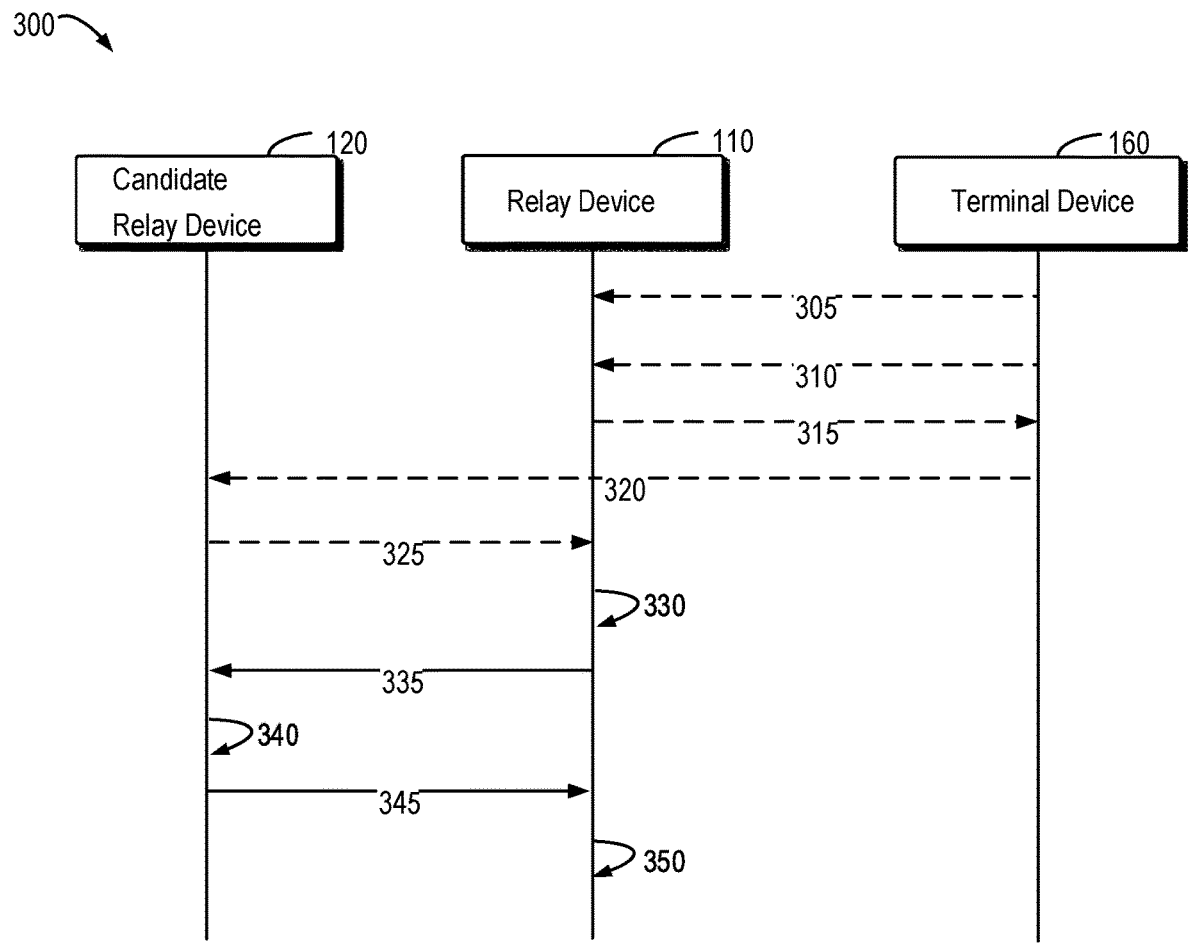
FIG. 3 illustrates a signaling chart of a procedure of handover for a terminal device according to some embodiments of the present disclosure.

FIG. 3 illustrates an signaling chart of a handover procedure of the terminal device 160 according to some embodiments of the present disclosure. For the sake of brevity, only the candidate relay device 120 is shown as an example. It would be appreciated that the handover procedure as shown in FIG. 3 is also adapted to the candidate relay device 130 and any other candidate relay device. Without loss of generality, only the description on the candidate relay device 120 will be given below. It would be appreciated that FIG. 3 is provided only as an example implementation, in which some steps as shown therein are optional or replaceable. Moreover, the execution sequence of the steps as shown in FIG. 3 may be altered according to different application scenarios and implementations. The present disclosure is not limited in the aspect.

In some embodiments, it is assumed that the terminal device 160 is being served by the first network slice of the relay device 110. For example, if a user corresponding to the terminal device 160 is moved to the edge of the coverage of the relay device 110, the terminal device 160 probably has to be handed over to other candidate relay device.

In some embodiments, the terminal device 160 may send 305 a first indication to the relay device 110 providing service thereto, to indicate that the terminal device 160 is to be handed over.

Alternatively, in some embodiments, the terminal device 160 may send 310, to the relay device 110, first channel quality of a channel between the terminal device 160 and the relay device 110.

In some other embodiments, the relay device 110 sends 310 a second indication to the terminal device 160. In response to the second indication, the terminal device 160 sends 320 a measurement signal to the candidate relay device 120. The candidate relay device 120 determines second channel quality of a channel between the terminal device 160 and the candidate relay device 120 based on the received measurement signal, and may send 325 the second channel quality to the relay device 110.

Additionally or alternatively, the candidate relay device 120 may send the second channel quality to the terminal device 160, and the terminal device 160 further sends the second channel quality to the relay device 110.

Based on the received first indication, first channel quality or second channel quality, the relay device 110 may determine 330 that the terminal device 160 has to be handed over. For example, when the first channel quality is lower than threshold quality, the relay device 110 determines 330 that the terminal device 160 has to be handed over. Alternatively, when the first channel quality is lower than the threshold quality, the relay device 110 determines 330 that the terminal device 160 has to be handed over, in response to the first channel quality being lower than the second channel quality.

In response to the relay device 110 determining that the terminal device 160 has to be handed over, the relay device 110 sends 335 a request for a local message to the candidate relay device 120. The candidate relay device 120 determines 340 a local message and sends 345 the local message to the relay device 110. Please refer to the above description with reference to FIG. 2, for the details on the local message which are omitted here. Based on the received local message, the relay device 110 determines 350 a target relay device for the terminal device 160, for use in the handover of the terminal device 160.

Figure 4:
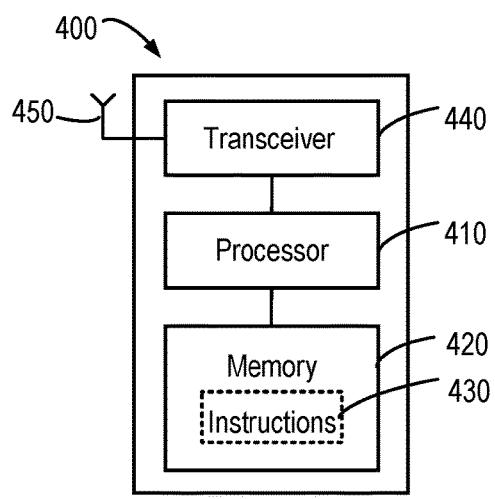
FIG. 4 illustrates a diagram of a relay device according to some embodiments of the present disclosure.

FIG. 4 illustrates a diagram of a relay device 400 according to embodiments of the present disclosure. The relay device 400 may be used, for example, to implement the relay devices 110, 120, 130 and 140 in the embodiments of the present disclosure and other appropriate relay devices.

As shown in the example of FIG. 4, the relay device 400 includes a processor 410. The processor 410 controls the operation and functionality of the device 400. For example, in some embodiments, the processor 410 may execute various operations through an instruction 430 stored in a memory 420 coupled thereto. The memory 420 may be of any appropriate type adapted to the local technical environment, and may be implemented using any appropriate data storage technique, including, but not limited to, a semiconductor-based storage device, magnetic storage device and system, and optical storage device and system.

Although FIG. 4 only shows a memory unit, the relay device 400 may include therein a plurality of physically different memory units.

The processor 410 may be of any appropriate type adapted to the local technical environment, and may include, but is not limited to, a general computer, dedicated computer, microcontroller, digital signal controller (DSP) and one or more cores in controller-based multicore controller architecture. The relay device 400 may also include a plurality of processors 410. The processor 410 may be coupled to a transceiver 440 which may receive and transmit information via one or more antennas 450 and/or other components.

According to embodiments of the present disclosure, the processor 410 and the memory 420 may be operated cooperatively to implement portions of the method 200 as described in FIG. 2 and/or portions of the procedure 300 as described in FIG. 3. In particular, when the instructions 430 in the memory 420 are executed by the processor 410, the relay device 400 may be caused to perform portions of the method 200 and/or the process 300 described in FIG. 3. It would be appreciated that the features described above are all applicable to the relay device 400, which are omitted here.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. When various aspects of embodiments of the present disclosure are illustrated and described as block diagrams, flowcharts, or using some other pictorial representation, it will be appreciated that the blocks, devices, systems, techniques or methods described herein may be implemented in, as non-limiting examples, hardware, software, firmware, special purpose circuits or logic, general purpose hardware or controller or other computing devices, or some combination thereof.

For example, the embodiments of the present disclosure may also be described in the context of the machine executable instruction which, for example, includes program modules executed in the device on a physical or virtual processor. In general, program modules include routines, programs, libraries, objects, classes, components, data structures or the like, which perform particular tasks or implement particular abstract data structures. The functionality of the program modules may be combined or split between program modules as described herein. Machine-executable instructions for program modules may be executed within a local or distributed device. In a distributed device, program modules may be located in both local and remote storage media.

Program code for carrying out methods of the present disclosure may be written in any combination of one or more programming languages. These computer program codes may be provided to a processor of a general purpose computer, special purpose computer, or other programmable data processing apparatus, such that the program codes, when executed by a computer or other programmable data processing devices, cause the functions/operations specified in the flowcharts and/or block diagrams to be implemented. The program code may be executed entirely on a machine, partly on the machine, or, as a stand-alone software package, executed partly on the machine and partly on a remote machine or entirely on the remote machine or server.

In the context of the present disclosure, the machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    determining whether a terminal device served by a relay device in a communication network is to be handed over, the terminal device being served by a network slice supported by the relay device, the network slice corresponding to a configuration of a set of network functions in the communication network;
    in response to determining that the terminal device is to be handed over, sending a request for local information to at least one candidate relay device, the local information of each candidate relay device comprising at least information associated with a backhaul link from the candidate relay device to a network device; and
    in response to receiving the local information from the at least one candidate relay device, determining, based on the local information, a candidate relay device for handover of the terminal device from the at least one candidate relay device, wherein determining the candidate relay device from the at least one candidate relay device comprises:
        determining information associated with a backhaul delay of the backhaul link based on the information associated with the backhaul link; and
        determining, based on the determined information associated with the backhaul delay, the candidate relay device corresponding to a minimum backhaul delay from the at least one candidate relay device for handover of the terminal device.

2. The method of claim 1, wherein determining whether the terminal device served by the relay device is to be handed over comprises:
    in response to receiving, from the terminal device, a first indication indicating that the terminal device is to be handed over, determining that the terminal device is to be handed over.

3. The method of claim 1, wherein determining whether the terminal device served by the relay device is to be handed over comprises:
    receiving, from the terminal device, first channel quality of a channel between the terminal device and the relay device; and
    in response to the first channel quality being lower than threshold quality, determining that the terminal device is to be handed over.

4. The method of claim 3, wherein determining, in response to the first channel quality being lower than the threshold quality, that the terminal device is to be handed over comprises:
    in response to the first channel quality being lower than the threshold quality, comparing the first channel quality with second channel quality of at least one channel between the terminal device and the at least one candidate relay device; and
    in response to the first channel quality being lower than the second channel quality, determining that the terminal device is to be handed over.

5. The method of claim 4, further comprising:
    sending, to the terminal device, a second indication to enable the terminal device to send a measurement signal to the at least one candidate relay device, the measurement signal being measured by the at least one candidate relay device to determine the second channel quality; and receiving the second channel quality from the at least one candidate relay device.

6. The method of claim 1, wherein the local information further comprises slice configuration information of the at least one candidate relay device, and wherein determining the candidate relay device from the at least one candidate relay device further comprises:

determining, based on the slice configuration information of the at least one candidate relay device, the candidate relay device supporting the network slice from the at least one candidate relay device for handover of the terminal device.

7. An apparatus, comprising:
a processor; and
a memory storing instructions which, when executed by the processor, cause the apparatus to perform:
determining whether a terminal device served by a relay device in a communications network is to be handed over, the terminal device being served by a network slice supported by the relay device, the network slice corresponding to a configuration of a set of network functions in the communication network;
in response to determining that the terminal device is to be handed over, sending a request for local information to at least one candidate relay device, the local information of each candidate relay device comprising at least information associated with a backhaul link from the candidate relay device to a network device; and
in response to receiving the local information from the at least one candidate relay device, determining, based on the local information, a candidate relay device for handover of the terminal device from the at least one candidate relay device, wherein determining the candidate relay device from the at least one candidate relay device comprises:
determining information associated with a backhaul delay of the backhaul link based on the information associated with the backhaul link; and
determining, based on the determined information associated with the backhaul delay, the candidate relay device corresponding to a minimum backhaul delay from the at least one candidate relay device for handover of the terminal device.

8. The apparatus of claim 7, wherein determining whether the terminal device served by the relay device is to be handed over comprises:
in response to receiving, from the terminal device, a first indication indicating that the terminal device is to be handed over, determining that the terminal device is to be handed over.

9. The apparatus of claim 7, wherein determining whether the terminal device served by the relay device is to be handed over comprises:
receiving, from the terminal device, first channel quality of a channel between the terminal device and the relay device; and
in response to the first channel quality being lower than threshold quality, determining that the terminal device is to be handed over.

10. The apparatus of claim 9, wherein determining, in response to the first channel quality being lower than the threshold quality, that the terminal device is to be handed over comprises:

in response to the first channel quality being lower than the threshold quality, comparing the first channel quality with second channel quality of at least one channel between the terminal device and the at least one candidate relay device; and in response to the first channel quality being lower than the second channel quality, determining that the terminal device is to be handed over.

11. The apparatus of claim 7, wherein the acts further comprise:
sending, to the terminal device, a second indication to enable the terminal device to send a measurement signal to the at least one candidate relay device, the measurement signal being measured by the at least one candidate relay device to determine the second channel quality; and receiving the second channel quality from the at least one candidate relay device.

12. The apparatus of claim 7, wherein the local information further comprises the slice configuration information of the at least one candidate relay device, and wherein determining the candidate relay device from the at least one candidate relay device further comprises:
determining, based on the slice configuration information of the at least one candidate relay device, the candidate relay device supporting the network slice from the at least one candidate relay device for handover of the terminal device.

13. A non-transitory tangible computer readable storage medium comprising program code stored thereon which, when executed by an apparatus, cause the apparatus to:
determine whether a terminal device served by a relay device in a communications network is to be handed over, the terminal device being served by a network slice supported by the relay device, the network slice corresponding to a configuration of a set of network functions in the communication network;
in response to determining that the terminal device is to be handed over, send a request for local information to at least one candidate relay device, the local information of each candidate relay device comprising at least information associated with a backhaul link from the candidate relay device to a network device; and
in response to receiving the local information from the at least one candidate relay device, determine, based on the local information, a candidate relay device for handover of the terminal device from the at least one candidate relay device, wherein the program code configured to determine the candidate relay device from the at least one candidate relay device comprises program code configured to:
determine information associated with a backhaul delay of the backhaul link based on the information associated with the backhaul link; and
determine, based on the determined information associated with the backhaul delay, the candidate relay device corresponding to a minimum backhaul delay from the at least one candidate relay device for handover of the terminal device.

14. The tangible computer readable storage medium of claim 13, wherein the program code configured to determine whether the terminal device served by the relay device is to be handed over comprises program code configured, in response to receiving, from the terminal device, a first indication indicating that the terminal device is to be handed over, to determine that the terminal device is to be handed over.

15. The tangible computer readable storage medium of claim 13, wherein the program code configured to determine whether the terminal device served by the relay device is to be handed over comprises program code configured to:
receive, from the terminal device, first channel quality of a channel between the terminal device and the relay device; and
in response to the first channel quality being lower than threshold quality, determine that the terminal device is to be handed over.

16. The tangible computer readable storage medium of claim 15, wherein the program code configured to determine, in response to the first channel quality being lower than the threshold quality, that the terminal device is to be handed over comprises program code configured to:
in response to the first channel quality being lower than the threshold quality, compare the first channel quality with second channel quality of at least one channel between the terminal device and the at least one candidate relay device; and
in response to the first channel quality being lower than the second channel quality, determine that the terminal device is to be handed over.

17. The tangible computer readable storage medium of claim 13, wherein the program code is further configured to:
send, to the terminal device, a second indication to enable the terminal device to send a measurement signal to the at least one candidate relay device, the measurement signal being measured by the at least one candidate relay device to determine the second channel quality; and
receive the second channel quality from the at least one candidate relay device.

18. The tangible computer readable storage medium of claim 13, wherein the local information further comprises slice configuration information of the at least one candidate relay device, and wherein the program code configured to determine the candidate relay device from the at least one candidate relay device further comprises program code configured to:
determine, based on the slice configuration information of the at least one candidate relay device, the candidate relay device supporting the network slice from the at least one candidate relay device for handover of the terminal device.

* * * * *

UNITED STATES PATENT AND TRADEMARK OFFICE
CERTIFICATE OF CORRECTION

PATENT NO. : 11,218,944 B2
APPLICATION NO. : 16/769292
DATED : January 4, 2022
INVENTOR(S) : Gu et al.

Page 1 of 1

It is certified that error appears in the above-identified patent and that said Letters Patent is hereby corrected as shown below:

In the Claims

Column 14,
Line 20, "further comprises the slice configuration information" should read --further comprises slice configuration information--.

Signed and Sealed this
Twentieth Day of December, 2022

Katherine Kelly Vidal
*Director of the United States Patent and Trademark Office*